April 2, 1940.                 T. J. BAY                 2,195,403
                      CONDENSER TUBE PROTECTOR
                         Filed April 14, 1939

INVENTOR
BY   THOMAS J. BAY
     ATTORNEY

Patented Apr. 2, 1940

2,195,403

UNITED STATES PATENT OFFICE 2,195,403

CONDENSER TUBE PROTECTOR

Thomas J. Bay, United States Navy

Application April 14, 1939, Serial No. 267,878

2 Claims. (Cl. 285—54)

(Granted under the act of March 3, 1883, as amended April 30, 1928; 370 O. G. 757)

This invention relates to condenser tube protectors and it has a particular relation to inserts of rubber or rubber-like material for preventing the corrosion of the tubes adjacent to their inlet ends by the water passing therethrough, such as the insert disclosed in Letters Patent No. 2,157,107, issued to me and dated May 9, 1939.

The principal object of the present invention is the provision of an insert of resilient material having an annular metallic member molded in or vulcanized thereto adjacent its outer end for resisting any tendency to deform due to the force produced by the turbulent flow of the circulating water across the tube sheet and into the end of the tube and for securing the insert in position in the end of the tube.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

Figure 1:
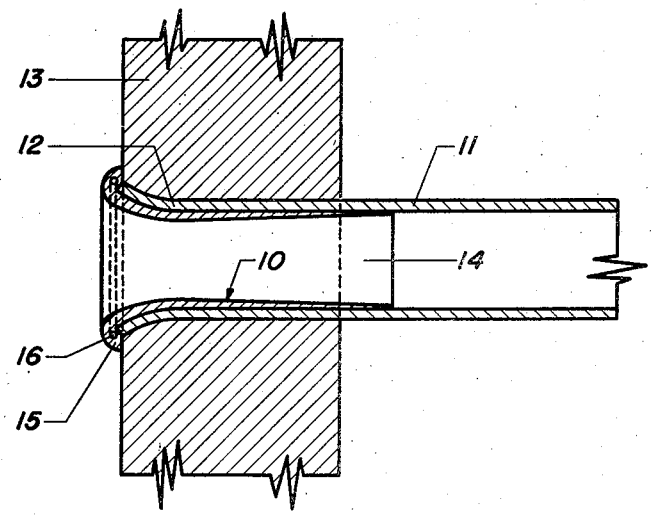
Figure 2:
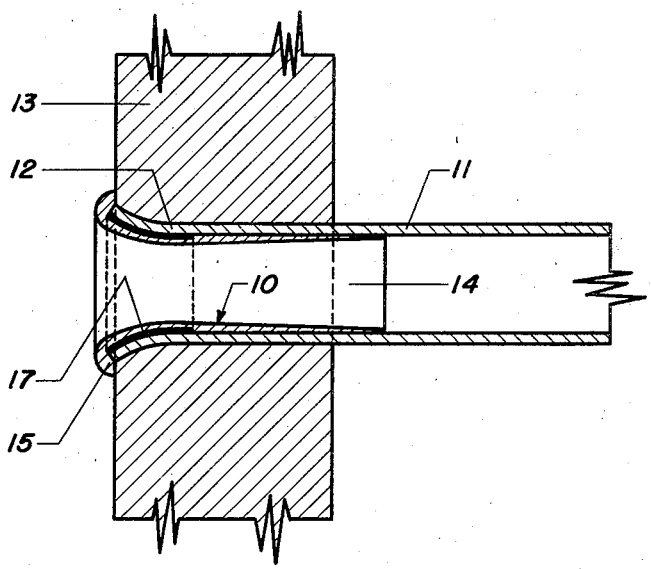

In the accompanying drawing:

Fig. 1 is a longitudinal sectional view through a condenser tube and a protective insert embodying the invention, and Fig. 2 is a similar view of another form of the invention.

Referring to the drawing, and particularly to Fig. 1 thereof, a condenser tube protective insert 10 of rubber or rubber-like material is shown as being secured in the outer or inlet end of a condenser tube 11 having a flared outer end 12 fixed in a condenser header plate 13. The insert 10 is formed with a tapered tubular body portion 14 having a feathered inner end and a flanged outer end 15 adapted to embrace the flared outer end of the tube 11 and is secured in position by cement or by vulcanizing. In the foregoing respects the insert 10 is similar in all respects to that disclosed in my patent hereinabove identified.

In order, however, to prevent the force of the water entering the tube from distorting the outer end of the insert, I propose to incorporate therein an annular reinforcing member or ring 16 which is preferably molded in the flange 15 thereof. This ring materially resists any undue flexing of the flange 15 and prevents a rupture of its sealing relation with respect to the juncture of the tube 11 and header plate 13.

With reference to Fig. 2, the protective insert 10 is reenforced by a flared metallic retaining sleeve or bushing 17 of relatively thin gauge metal which is vulcanized or otherwise bonded to the outer surface of the outer end of the insert. This sleeve is placed in the mold used to form the insert and when the rubber-like material is molded in contact with it, the sleeve becomes vulcanized to the insert material. For new condenser tube installments the dimensional characteristics of the retaining sleeve are such that it forms a light drive fit with the end of the condenser tube, the metal being sufficiently deformable to conform to the configuration of the end of the tube. In cases where the inserts are to be used in condenser tubes which have been partly eroded in service, the dimensions are such that the outside diameter is slightly smaller than the existing inside diameter of the inlet end of the condenser tube. After assembly of the insert in the condenser tube, the insert is expanded into the end of the tube by means of a suitably shaped mandrel or sectional expanding tool.

When a protective tube insert provided with this retaining bushing is assembled in a condenser tube end by either of the means outlined above, the retaining bushing not only serves as a stiffener for the end of the rubber-like insert but also provides a positive means for securing the insert in place. It will be noticed that the bushing terminates short of the inner end of the insert so as to permit the exposed inner end of the latter to contact directly with the wall of the condenser tube. Thus, only nominal adhesion, such as is obtainable with ordinary types of rubber cement, is required between the exposed inner end of the insert and the condenser tube for sealing against the entrance of cooling water.

It will be understood that the above description and accompanying drawing comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

1. Means for protecting from corrosion the end of a tube extending through a header plate comprising a tubular insert of resilient material secured in the inlet end of said tube and sufficiently expansible to closely conform to irregularities in the configuration thereof for absorbing the impact of media entering said tube, and a relatively thin metallic bushing bonded to the outer surface of the inlet end of said insert and having a flanged end abutting the end of said tube for limiting the distance that said insert may enter said tube and for preventing the distortion thereof by the media circulating adjacent thereto, said bushing having a diameter of such size as to insure a tight fit with said tube for resisting its outward displacement therefrom and being sufficiently deformable to also conform to the shape of the end of said tube when forced into place.

2. Means for protecting from corrosion the end of a tube extending through a header plate comprising a tubular insert of resilient material secured in the inlet end of said tube and sufficiently expansible to closely conform to irregularities in the configuration thereof for absorbing the impact of media entering said tube, and a relatively thin metallic bushing vulcanized to the outer surface of the inlet end of said insert and having a flanged end abutting the end of said tube overlapped by a flange on said insert for limiting the distance that said insert may enter said tube and for preventing the distortion thereof by the media circulating adjacent thereto, said bushing having a diameter of such size as to insure a tight fit with said tube such as will resist its outward displacement therefrom and being sufficiently deformable to also conform to the shape of the end of said tube when forced into place, and said insert being of greater length than said bushing to permit its exposed inner end to contact directly the wall of said tube and be bonded thereto.

THOMAS J. BAY.